(12) United States Patent
Fukasawa (10) Patent No.: US 7,216,353 B2
(45) Date of Patent: May 8, 2007

(54) DISK-LOADING APPARATUS

(75) Inventor: Akihiro Fukasawa, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 336 days.

(21) Appl. No.: 10/921,886

(22) Filed: Aug. 20, 2004

(65) Prior Publication Data

US 2005/0081221 A1 Apr. 14, 2005

Related U.S. Application Data

(63) Continuation-in-part of application No. 10/096,592, filed on Mar. 14, 2002.

(30) Foreign Application Priority Data

Mar. 28, 2001 (JP) .............................. 2001-092426

(51) Int. Cl.
*G11B 17/04* (2006.01)
(52) U.S. Cl. ..................................................... 720/607
(58) Field of Classification Search ................ 720/607, 720/602; 360/291.2
See application file for complete search history.

(56) References Cited

U.S. PATENT DOCUMENTS

| 4,013,110 A | 3/1977 | Darling |
| 4,568,023 A | 2/1986 | Hayes |
| 5,469,310 A | 11/1995 | Slocum et al. |
| 6,160,780 A | 12/2000 | Furukawa et al. |
| 6,385,156 B1 | 5/2002 | Furukawa et al. |
| 6,590,849 B1 | 7/2003 | Yamauchi et al. |
| 2002/0110072 A1* | 8/2002 | Yanagiguchi .............. 369/75.2 |

FOREIGN PATENT DOCUMENTS

| JP | 5-266562 A | 10/1993 |
| JP | 8-255395 A | 10/1996 |
| JP | 11-154367 A | 6/1999 |

* cited by examiner

*Primary Examiner*—Angel Castro
(74) *Attorney, Agent, or Firm*—Birch, Stewart, Kolasch & Birch, LLP

(57) ABSTRACT

A main chassis supports a tray that carries a disk thereon and moves between a disk-discharging position and a disk-loading position. A motor is mounted on the main chassis and has a rotating shaft. A worm is formed on the rotating shaft. A drive gear rotatably is mounted on the main chassis and has a pinion gear and a worm wheel in mesh with the worm. The pinion gear is in mesh with a rack formed in the tray. The worm preferably satisfies a dimensional condition $\gamma o > \text{Tan}^{-1}(\mu/\text{Cos } \alpha n)$ where $\gamma o$ is a lead, $\mu$ is friction coefficient, and $\alpha n$ is normal pressure angle. The worm has a lead angle $\gamma o$ greater than 15°. The rotating shaft extends in a direction at an angle with a plane in which the drive gear rotates.

11 Claims, 14 Drawing Sheets

CONVENTIONAL ART

DISK-LOADING APPARATUS

This application is a Continuation-In-Part of copending application Ser. No. 10/096,592 filed on Mar. 14, 2002, the entire contents of which are hereby incorporated by reference and for which priority is claimed under 35 U.S.C. § 120.

BACKGROUND OF THE INVENTION

1. Field of the Invention

The present invention relates to a disk-loading apparatus for loading a CD and a DVD to their reproducing positions, and more particularly to a rotation-transmitting mechanism that transmits the rotation of a loading motor.

2. Description of the Related Art

Figure 16:
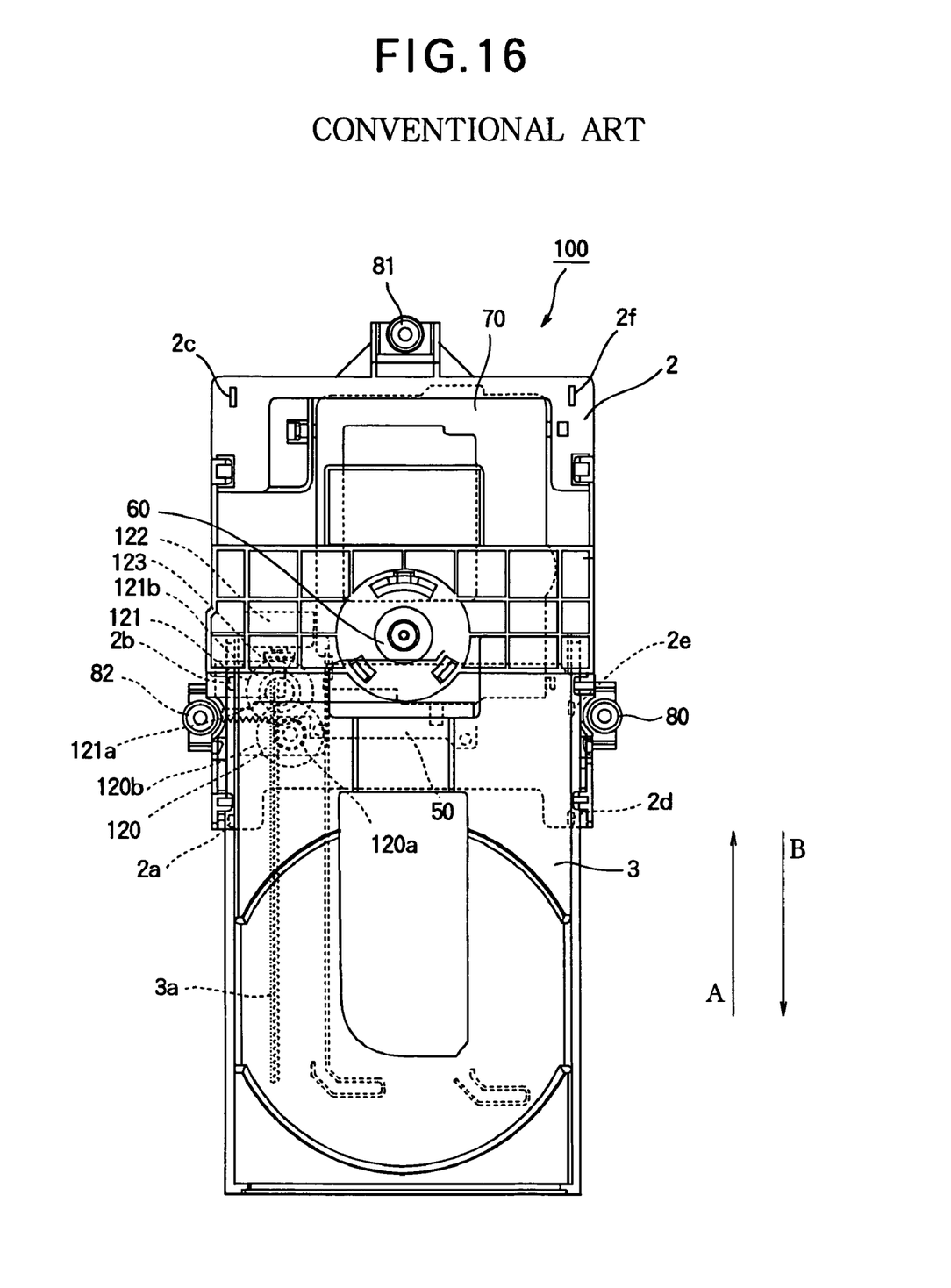
FIG. 16 is a top view of a conventional disk-loading apparatus.

FIG. 16 is a top view of a conventional disk-loading apparatus 100.

Referring to FIG. 16, a main chassis 2 supports a tray 3 thereon such that guides 2a–2f guide the tray 3 to slide on the main chassis 2. The tray 3 carries a disk, not shown, placed thereon and moves into the apparatus for loading the disk and out of the apparatus for discharging the disk. The tray 3 is formed with a rack 3a in an underside thereof on one side of the tray 3.

A drive gear 120 is rotatably mounted on the main chassis 2 and has a small gear 120a in mesh with the rack 3a. Likewise, a drive gear 121 is rotatably mounted on the main chassis 2 and has a small gear 121a in mesh with a large gear 120b of the drive gear 120.

Figure 17:
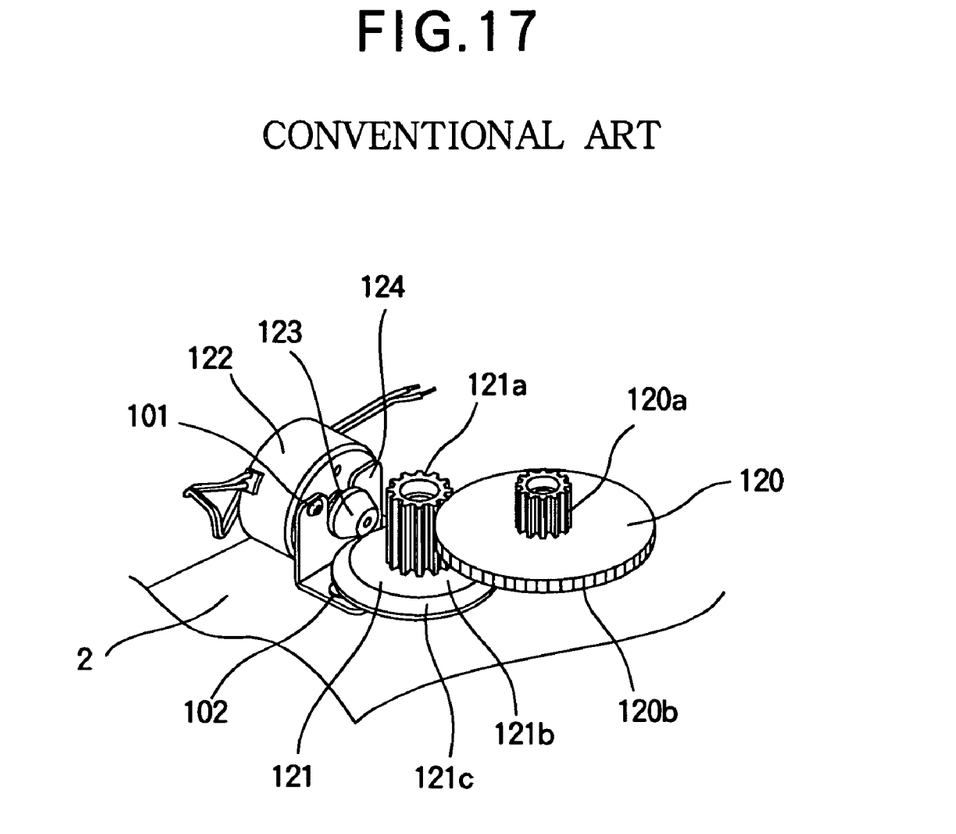
FIG. 17 is a perspective view of a pertinent portion of a rotation-transmitting mechanism of a loading motor of FIG. 16.

FIG. 17 is a perspective view of a pertinent portion of a rotation-transmitting mechanism of a loading motor of FIG. 16.

Referring to FIG. 17, the small gear 121a has a disk 121b mounted to an underside thereof, the disk 121b having a conical surface 121c. A loading motor 122 has a friction wheel 123 attached to a shaft thereof, the friction wheel 123 being in the shape of a truncated cone. The shaft of the loading motor 122 extends parallel to the main chassis 2 so that the conical surface 121c of the friction wheel 123 is in pressure contact with the conical surface 121 of the disk 121b. Thus, the rotation of the loading motor 122 is transmitted to the gear 121 through friction engagement of the friction wheel 123 with the disk 121.

The loading motor 122 is mounted on an L-shaped mounting member 124 by means of a screw 101. The L-shaped mounting member 124 is firmly mounted on the main chassis 2 by means of screws 102. The chassis 2 is mounted on a player chassis, not shown, by means of rubber dampers 80, 81, and 82 (FIG. 16).

A description will now be given of the operation of the above-described mechanism in which the tray 3 is moved in an insertion direction and a discharging direction relative to the main chassis 2.

When the loading motor 122 rotates, the friction wheel 123 drives the disk 121b of the gear 121 to rotate through friction engagement. Simultaneously, the rotation of the gear 121 is transmitted to the gear 120. The gear 120 in turn drives the tray 3 through rack-and-pinion engagement to move in either a direction shown by arrow A or a direction shown by arrow B of FIG. 16, depending on the direction of rotation of the loading motor 122.

The conventional disk-loading apparatus uses a friction wheel 123 formed of a highly frictional material such as rubber. The rotation of the loading motor 122 is transmitted to a driven mechanism through a frictional force. Therefore, the repetitive driving operation over a long time causes the friction wheel 123 to wear and dust to accumulate, so that the frictional force decreases gradually to cause the friction wheel 123 to slip on the conical surface 121c of the disk 121. As a result, the tray 3 cannot be inserted into and discharged out of the apparatus properly.

SUMMARY OF THE INVENTION

The present invention was made to solve the drawbacks of the aforementioned conventional disk-loading apparatus.

An object of the invention is to provide a disk-loading apparatus in which a disk-carrying tray can be inserted into and discharged out of the apparatus a large number of times.

Another object of the invention is to provide a disk-loading apparatus that performs reliable disk-inserting and disk-discharging operations.

A disk-loading apparatus includes a main chassis that supports a tray that carries a disk thereon and slides between a disk-discharging position and a disk-loading position. A motor is mounted on the main chassis and has a rotating shaft. A worm is formed on the rotating shaft. A drive gear rotatably is mounted on the main chassis and is rotatable about an axis substantially perpendicular to the plane. The drive gear has a worm and a worm wheel that rotate about the axis, the worm wheel being in mesh with the worm. A rack is formed in the tray and in mesh with the pinion gear so that the motor drives the tray to move between the disk-discharging position ad the disk-loading position.

The rotating shaft extends in a direction at an angle with a plane in which the disk moves when the tray moves between the disk-discharging position and the disk-loading position.

The worm preferably satisfies a dimensional condition $\gamma o > \tan^{-1}(\mu/\cos \alpha n)$ where $\gamma o$ is a lead angle, $\mu$ is friction coefficient, and $\alpha n$ is normal pressure angle.

The worm has a lead angle $\gamma o$ greater than 15°.

The motor has a threaded hole formed therein, the threaded hole extending parallel to the rotating shaft, the motor being mounted to the main chassis by means of a bolt screwed into the threaded hole.

A disk-loading apparatus has a main chassis that supports a tray. The main chassis carries a disk thereon and slides between a disk-discharging position and a disk-loading position. The disk-loading apparatus includes a motor, a worm, a drive gear, and a rack. The motor is mounted on the main chassis and having a rotating shaft. The worm is formed on the rotating shaft. The drive gear rotatably is mounted on the main chassis, the drive gear having a first gear and a second gear, the second gear being in mesh with said worm. The rack is formed in the tray and in mesh with the first gear so that when the motor rotates the tray is moved between the disk-discharging position and the disk-loading position. The rotating shaft extends in a direction at an angle with a plane in which the drive gear rotates.

The angle is substantially equal to a lead angle of said worm.

The lead angle is greater than 15°.

The drive gear is rotatable about an axis substantially perpendicular to a plane in which the tray moves.

The worm and the drive gear are meshed such that they are non-self locked during an operation of the disk-loading apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Fisrst Embodiment

{Construction}

Figure 1:
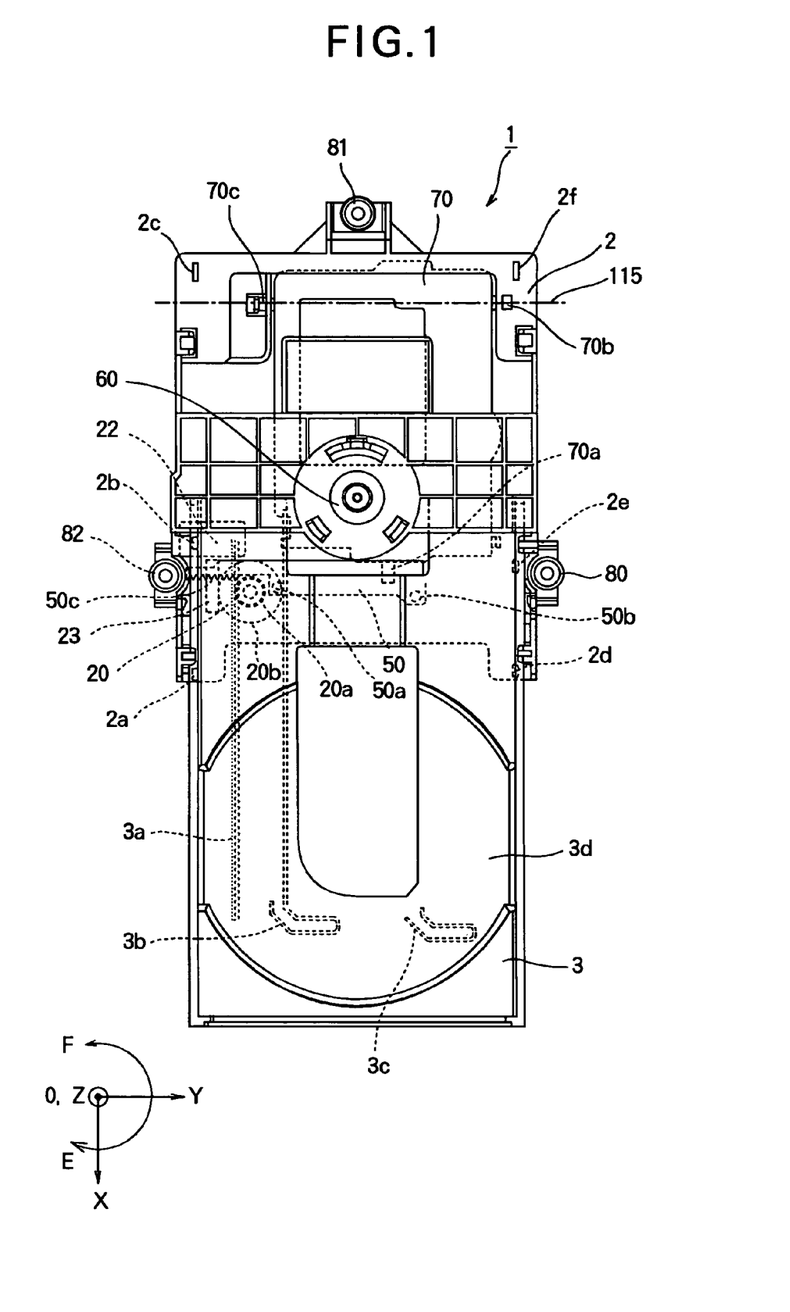
FIG. 1 is a top view of a disk-loading apparatus according to the present invention.

FIG. 1 is a top view of a disk-loading apparatus 1 according to the present invention.

Figure 2:
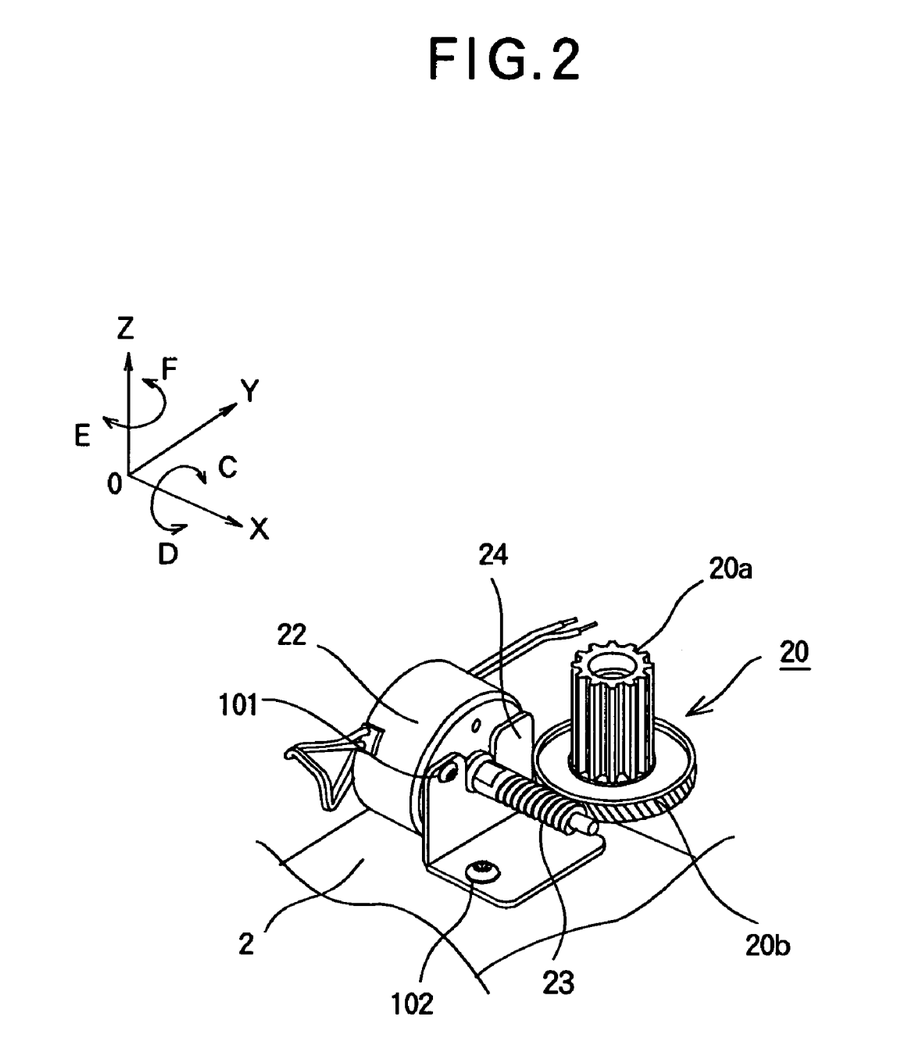
FIG. 2 is a perspective view of a pertinent portion of a rotation-transmitting mechanism of a loading motor.

FIG. 2 is a perspective view of a pertinent portion of a rotation-transmitting mechanism of a loading motor 22.

Referring to FIG. 1, a main chassis 2 supports a tray 3 thereon in such a way that the guides 2a–2f guide the tray 3 to slide on the main chassis 2. The tray 3 has a disk-carrying surface 3d on which a disk, not shown, is placed. The tray 3 is moved into and out of the apparatus with the disk placed on the disk-carrying surface 3d. The tray 3 has a rack 3a formed in an underside on one side of the tray 3. The tray 3 also has substantially L-shaped guide grooves 3b and 3c that are formed in the underside thereof and guide bosses 50a and 50b, respectively. The main chassis 2 is mounted to a player chassis, not shown, by means of rubber dampers 80–82.

Referring to FIGS. 1 and 2, the drive gear 20 includes a small gear (pinion) 20a and a worm wheel 20b. The drive gear 20 is mounted to the main chassis 2 so that the drive gear 20 is rotatable about an axis parallel to a Z-axis and the small gear 20a is in mesh with the rack 3a (FIG. 1). The loading motor 22 has a shaft that extends in a direction parallel to an X-axis. The shaft has a worm 23 that is formed thereon and is in mesh with the worm wheel 20b. The worm 23 and worm wheel 20b form a worm gear mechanism so that the loading motor 22 drives the drive gear 20 through the worm gear mechanism.

An L-shaped mounting member 24 is firmly mounted on the main chassis 2 by means of screws 102. The loading motor 122 is mounted on the L-shaped mounting member 24 by means of a screw 101.

Figure 6:
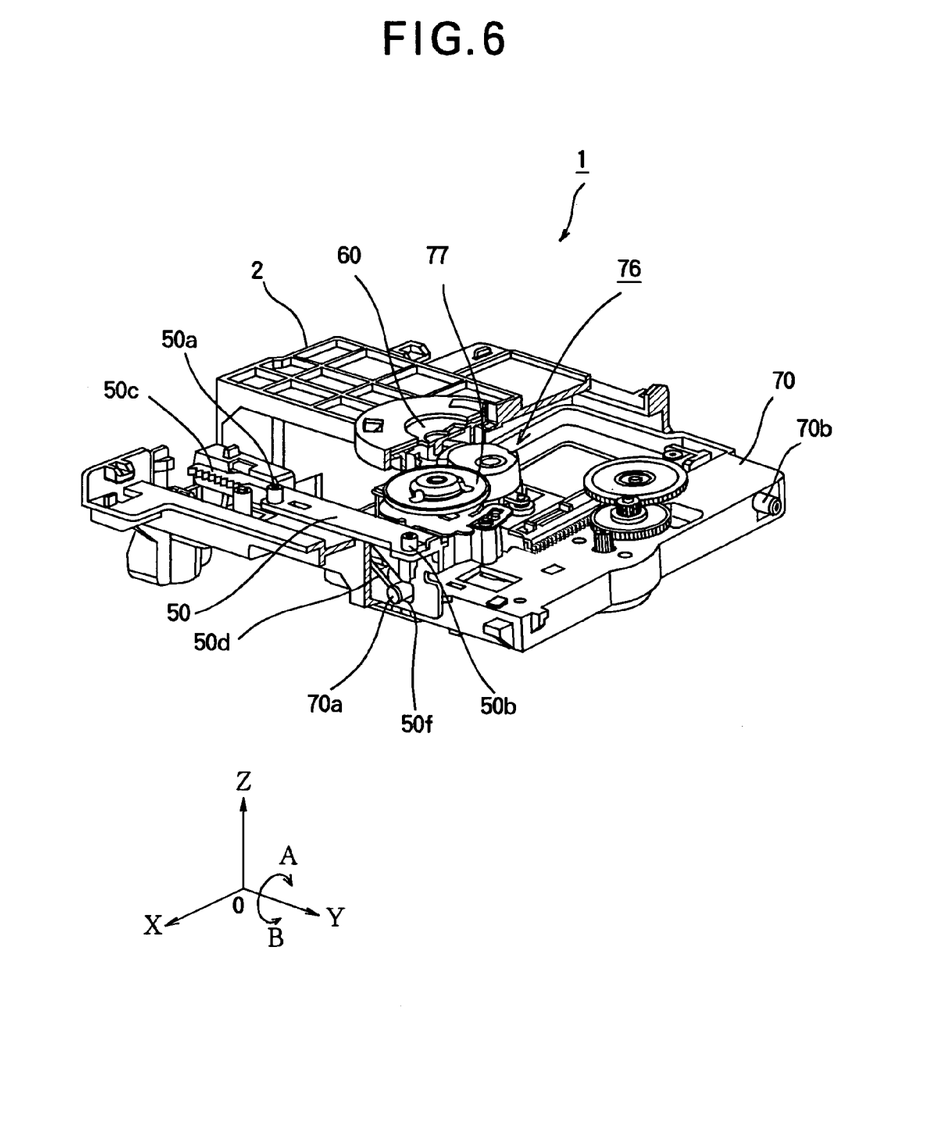
FIG. 6 is a perspective view that corresponds to FIG. 1.
Figure 7:
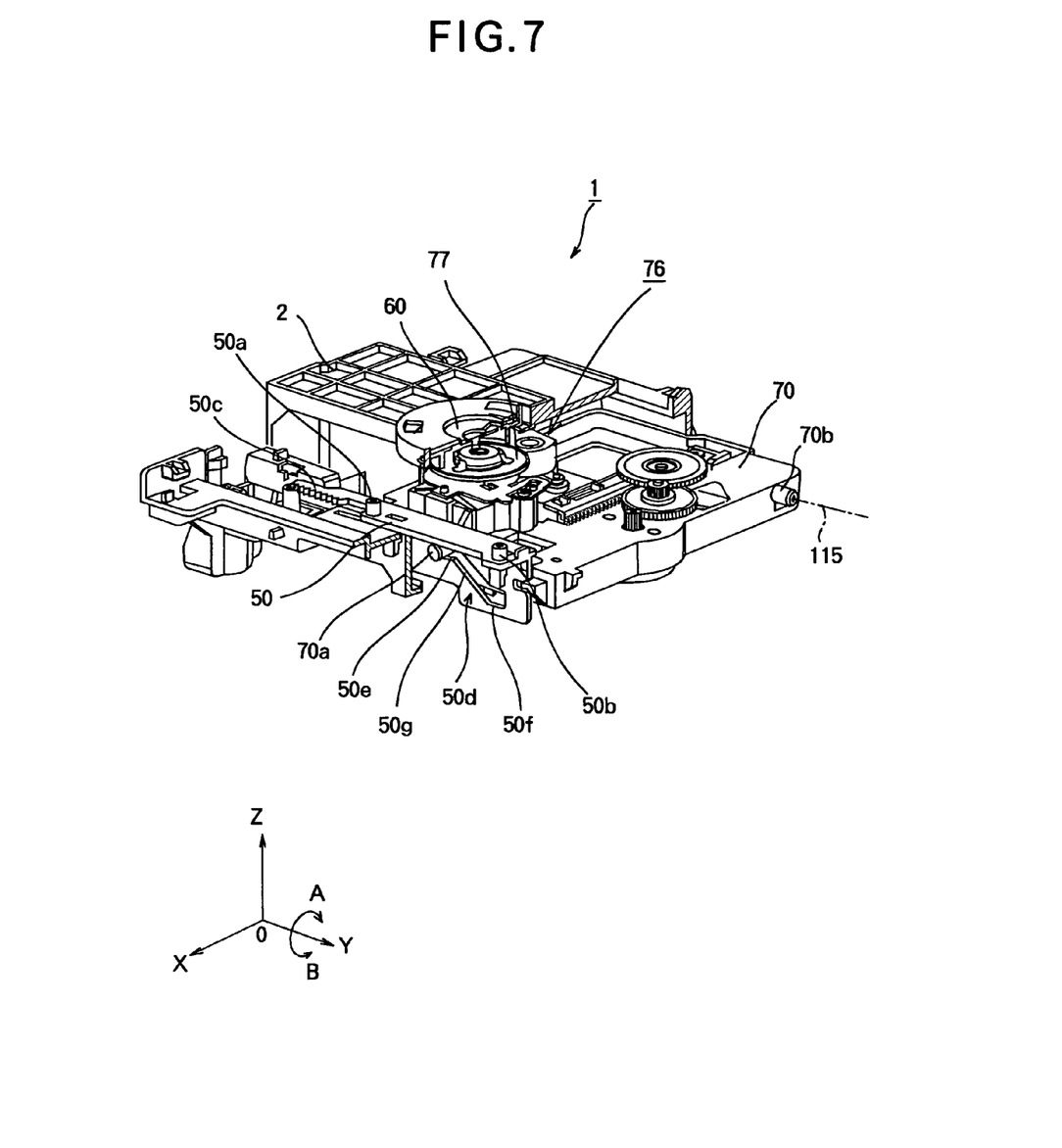
FIG. 7 is a perspective view that corresponds to FIG. 4.

FIG. 6 is a perspective view that corresponds to FIG. 1.
FIG. 7 is a perspective view that corresponds to FIG. 4.

As shown in FIG. 6, a cam slider 50 is generally L-shaped, and is supported on the main chassis 2 so that the cam slider 50 can slide on a Y-axis. The cam slider 50 has a rack 50c formed in its side portion and bosses 50a and 50b that project upwardly from a top surface of the cam slider 50. The bosses 50a and 50b engage the guide grooves 3b and 3c, formed in the tray 3, from the under the tray 3.

As shown in FIG. 7, the cam slider 50 has a flat portion parallel to a Z-Y plane. Formed in this flat portion is a cam groove 50d cam groove 50d includes a lower end 50f, an upper end 50e, and an inclined portion 50g that connects the lower and upper ends 50f and 50e.

A drive chassis 70 has a pair of bosses 70b and 70c (also see FIG. 3) that are in line with each other and project from opposite sides of the drive chassis 70. The drive chassis 70 is supported at the bosses 70b and 70c by the main chassis 2 and is rotatable about an axis 115 parallel to the Y-axis. The drive chassis 70 has a projection 70a that projects in a direction perpendicular to the axis 115. The projection 70a loosely fits into the cam groove 50d formed in the cam slider 50. Therefore, when the cam slider 50 moves back and forth along the Y-axis, the drive chassis 70 rotates about the axis 115 in directions shown by arrows A and B. The drive chassis 70 carries a reproducing mechanism that includes an optical pick-up 76.

{Operation}

A disk-loading operation will now be described with reference to FIGS. 1–4.

Figure 3:
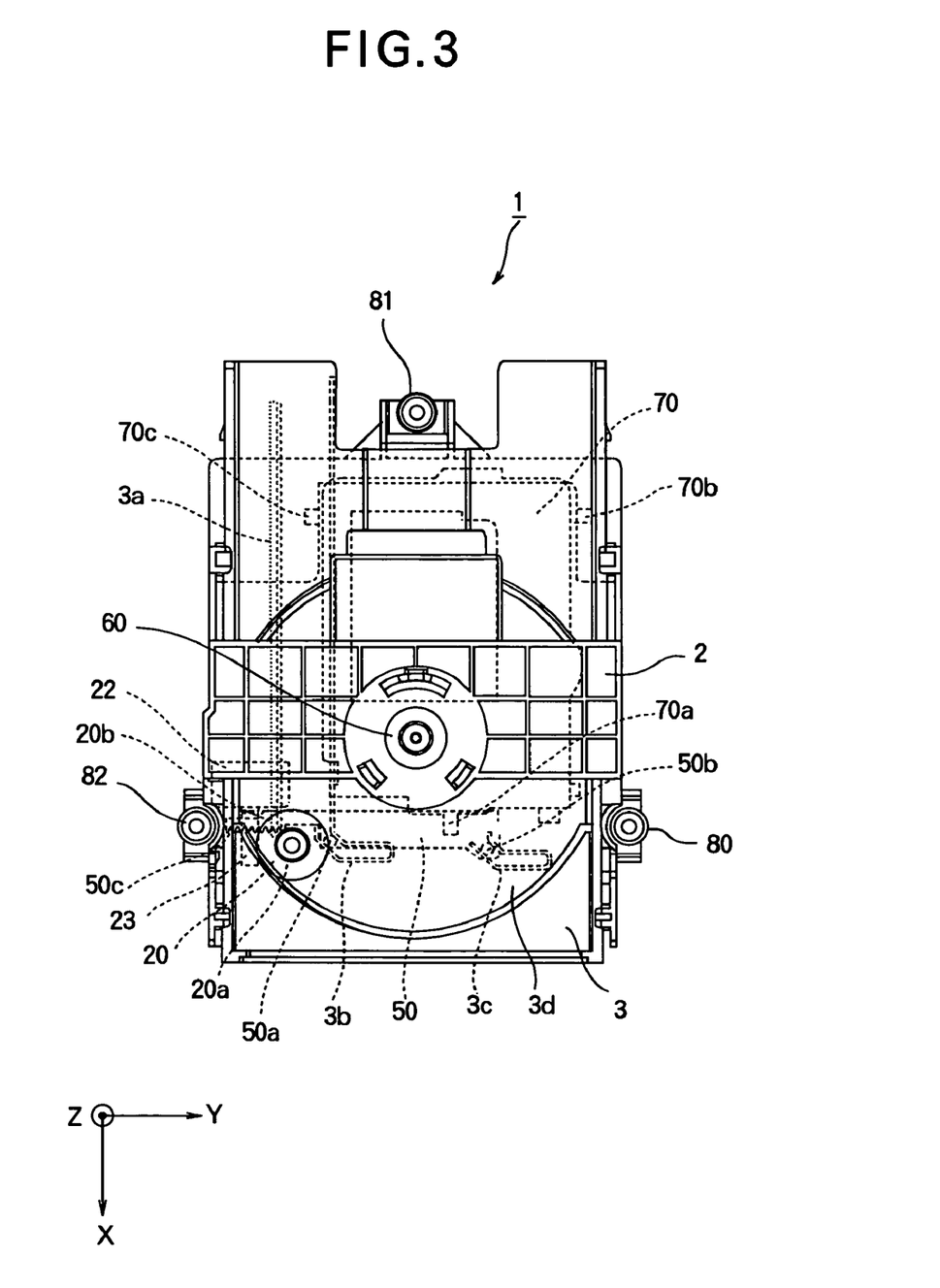
FIG. 3 illustrates the tray when it is immediately before the disk-loading position.

FIG. 3 illustrates the tray when it is positioned immediately before the disk-loading position.

Figure 4:
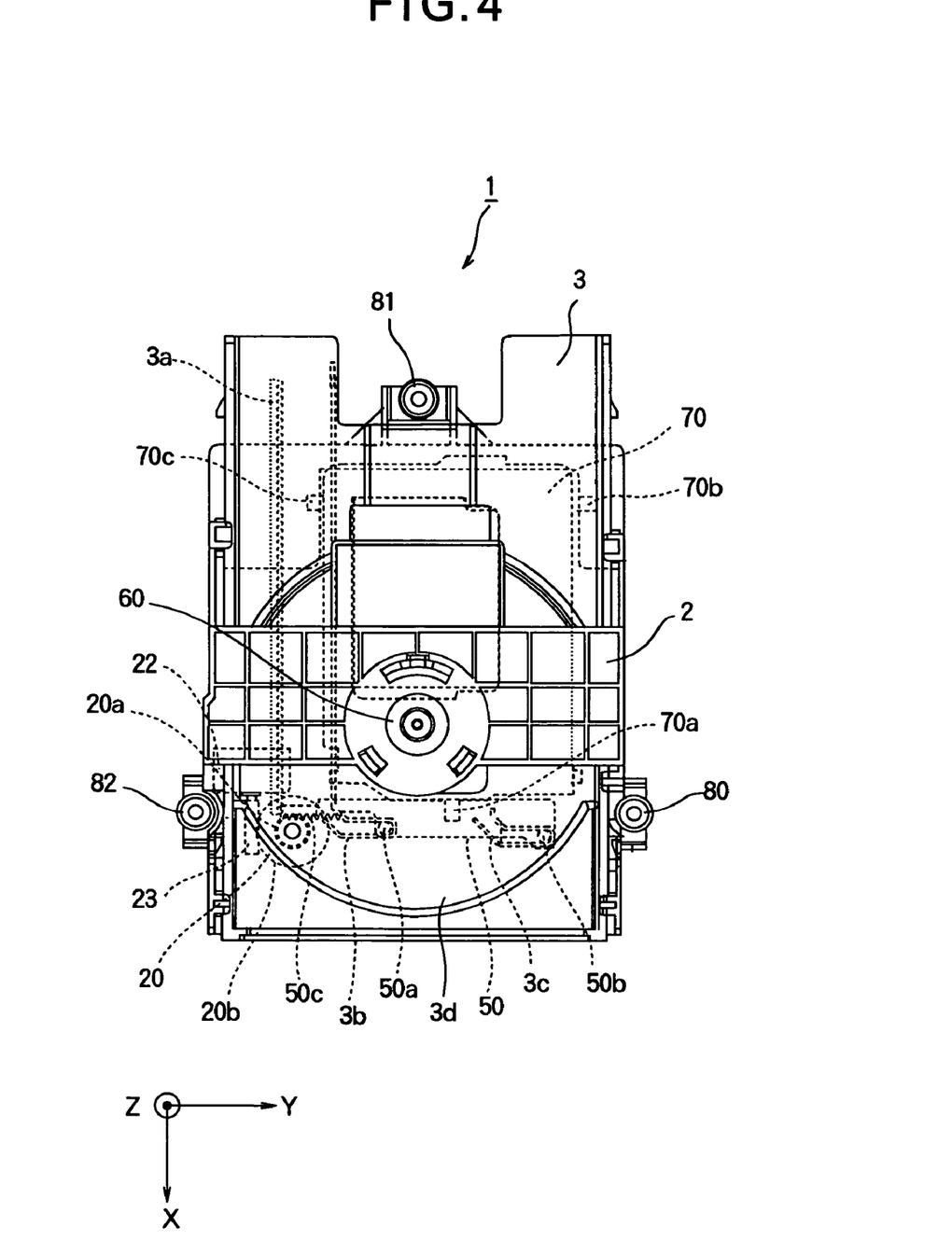
FIG. 4 illustrates the tray when it reaches the disk-loading position.

FIG. 4 illustrates the tray when it reaches the disk-loading position.

Figure 5:
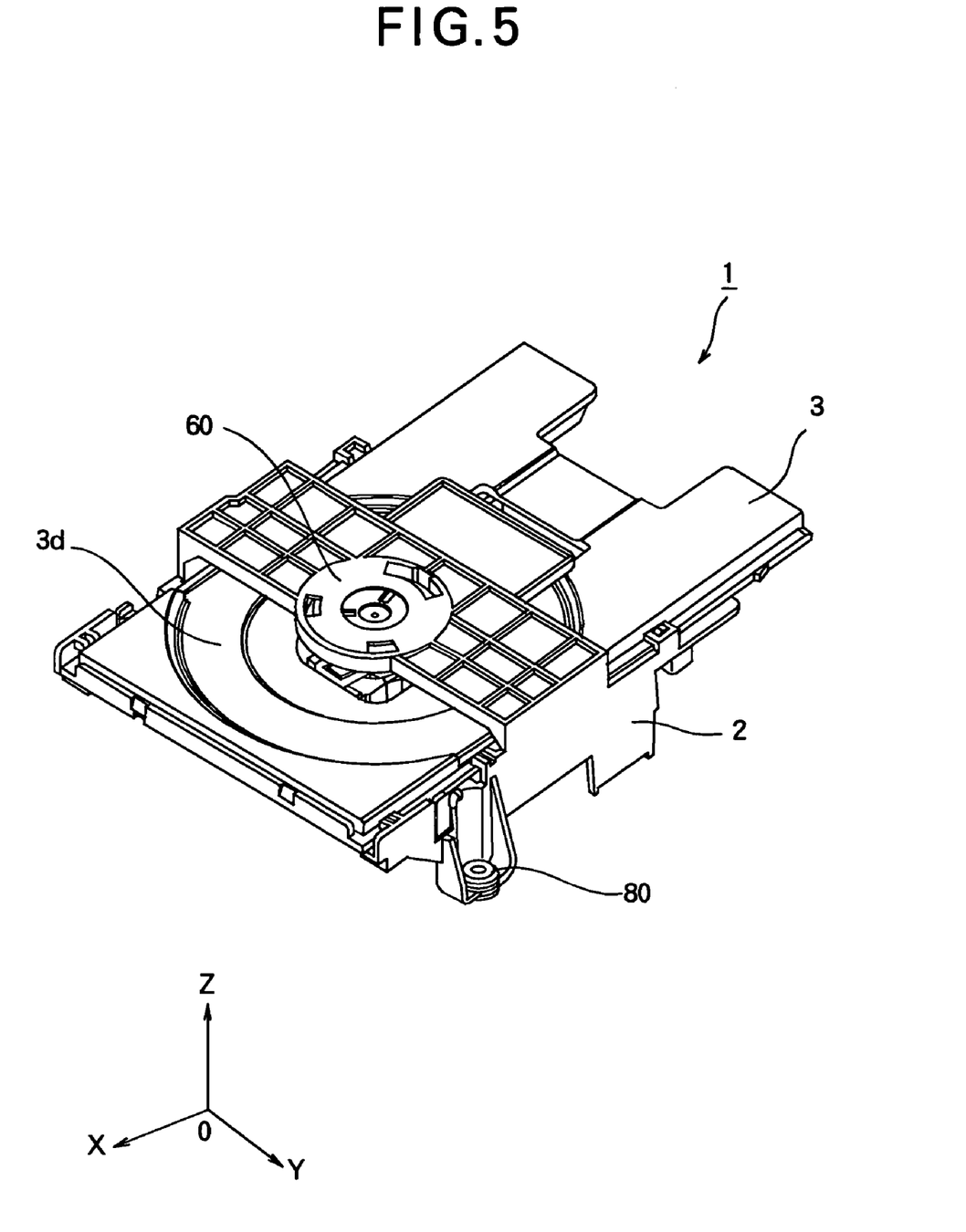
FIG. 5 is a perspective view of the tray when it reaches the disk-loading position.

FIG. 5 is a perspective view of the tray when it reaches the disk-loading position.

In a disk-loading operation, the tray 3 moves from a position (disk-discharging position) shown in FIG. 1 to a position (disk-loading position) shown in FIG. 4 for reproducing information from the disk.

When the loading motor 22 of FIG. 2 rotates in a direction shown by arrow C, the drive gear 20 rotates in a direction shown by arrow E. The rotation of the drive gear 20 in the E direction is transmitted through the worm gear mechanism so that the tray 3 moves on the X-axis from the disk-discharging position of FIG. 1 toward the disk-loading position (i.e., toward the origin of X axis). In other words, the rotation of the loading motor 22 in the C direction causes the tray 3 to slide along the guides 2a–2e, thereby initiating the disk-loading operation.

At this moment, the rotation of the loading motor 22 is greatly reduced through the worm 23 and the worm wheel 20b, so that the drive gear 20 rotates at a low speed. Thus, the tray 3 moves into the apparatus quietly without making any noticeable noise.

As shown in FIG. 3, when the tray 3 reaches a location immediately before the disk-loading position, the bosses 50a and 50b of the cam slider 50 move into engagement with the oblique portions of the L-shaped guide grooves 3b and 3c of the tray 3, so that the cam slider 50 moves on the Y-axis away from the origin O. The movement of the cam slider 50 on the Y-axis causes the rack 50c to move into meshing engagement with the small gear 20a of the drive gear 20. At this time, the rack 3a formed in the underside of the tray 3 is still in mesh with the small gear 20a of the drive gear 20, but disengages from the small gear 20a when the tray 3 has reached the disk-loading position shown in FIG. 4.

As shown in FIG. 4, the cam slider 50 continues to move on the Y-axis since the rack 50c remains in mesh with the drive gear 20 until the bosses 50a and 50b reach the end portions of the guide grooves 3b and 3c of the tray 3, respectively, where the cam slider 50 stops moving and the tray 3 completes the disk-loading operation.

The disk-loading operation will be described in more detail. As shown in FIG. 6, the projection 70a of the drive chassis 70 remains in engagement with the lower end 50f of the cam groove 50d to maintain its inclined position with respect to the disk-carrying surface 3d of the tray 3 until the bosses 50a and 50b of the cam slider 50 are guided, as shown in FIG. 3, along the L-shaped guide grooves 3b and 3c and start moving on the Y-axis away from the origin. At this moment, a turn table 77 disposed on the drive chassis 70 has retracted downward away from the disk-carrying surface 3d.

Then, when the tray 3 reaches the disk-loading position and the cam slider 50 has started moving on the Y-axis away from the origin as shown in FIG. 3, the projection 70a of the drive chassis 70 reaches the upper end 50e through the inclined portion 50g. Thus, the drive chassis 70 rotates about the axis 115 in the direction shown by arrow A to reach a position of FIG. 7. When the drive chassis 70 is rotating about the axis 115, the turn table 77 on the drive chassis 70 raises the disk, not shown, placed on the disk-carrying surface, so that the disk abuts a clamper 60 disposed on the main chassis 2 to be pressed against the turn table 77.

This completes the disk-loading operation. The apparatus is now ready for reproduction of information from the disk. The optical pick-up 76 of the reproducing mechanism, disposed on the drive chassis 70, operates continuously or intermittently to reproduce the information recorded on the disk.

When the tray 3 is to be moved from the disk-reproducing position back to the disk-discharging position of FIG. 1, the loading motor 22 is rotated in the opposite direction, i.e., in a direction shown by arrow D (FIG. 2). As a result, the mechanism performs the aforementioned movements in a reverse order.

The disk-loading mechanism according to the first embodiment provides a rotation-transmitting mechanism for the loading motor without involving a friction type rotation-transmitting means, thereby allowing the rotational force of the loading motor to be transmitted reliably.

Second Embodiment

Figure 8A:
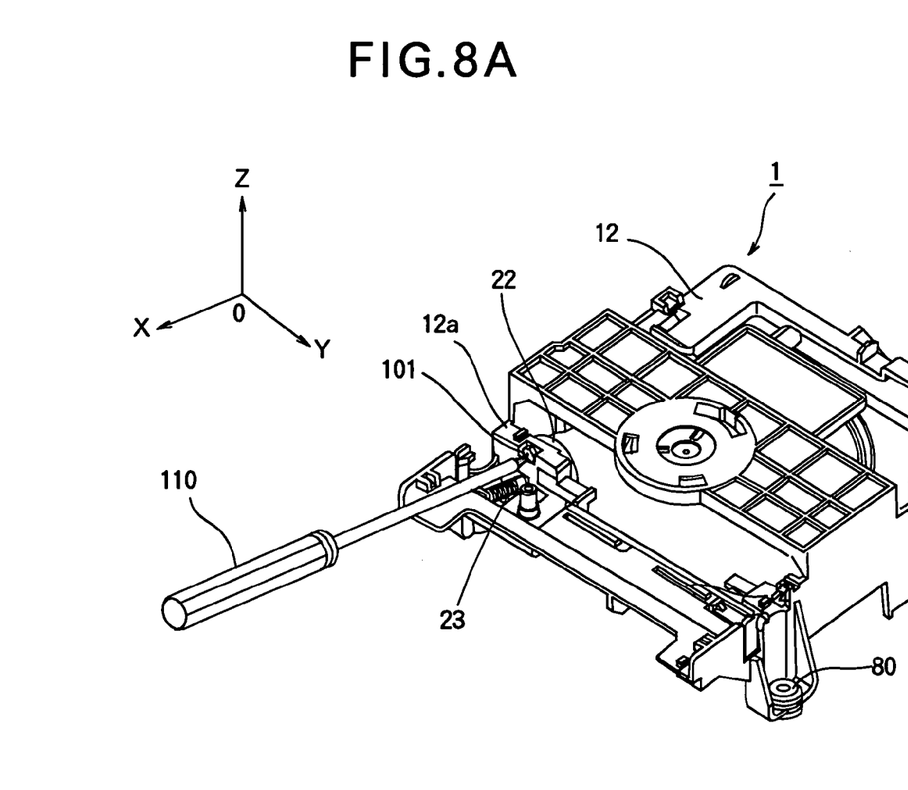
FIG. 8A is a perspective view of a mounting section of the loading motor according to a second embodiment.

FIG. 8A is a perspective view of a mounting section of the loading motor according to a second embodiment.

The second embodiment differs from the first embodiment in that the loading motor 22 is mounted directly to a main chassis 12 without using a mounting member as a separate component. The rest of the construction is the same as that of the first embodiment.

Figure 8B:
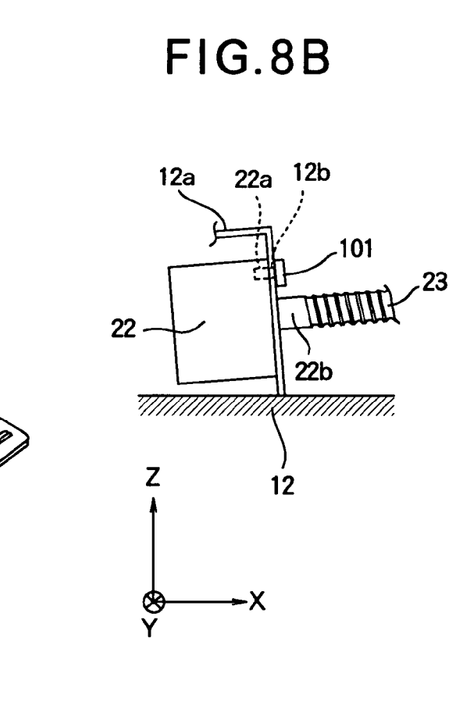
FIG. 8B is the loading motor as seen in the direction of the Y-axis from the origin.

FIG. 8B illustrates the loading motor as seen in the direction of the Y-axis from the origin.

Referring to FIGS. 8A and 8B, the main chassis 12 has a motor holder 12a formed in one piece therewith and the motor holder 12a holds the loading motor 22 in position. The motor holder 12a has a hole 12b formed therein and the loading motor 22 has a female-threaded hole 22a. The loading motor 22 is fixed to the motor holder 12a by screwing a bolt 101 into the female-threaded hole 22a through the hole 12b. The motor holder 12a is inclined so that the shaft 22b of the loading motor 22 makes an angle with the surface of the main chassis 12.

Therefore, the female-threaded hole 22a formed in the loading motor 22 is also at an angle with the surface of the main chassis 12, facilitating the screwing of the bolt 101 into the loading motor 22 by means of a screw driver 110.

In the second embodiment, the teeth of the worm wheel 20b are shaped to accommodate the inclination of the shaft 22b of the loading motor 22, so that the worm 23 remains in good meshing engagement with the worm wheel 20b.

Third Embodiment

Figure 9:
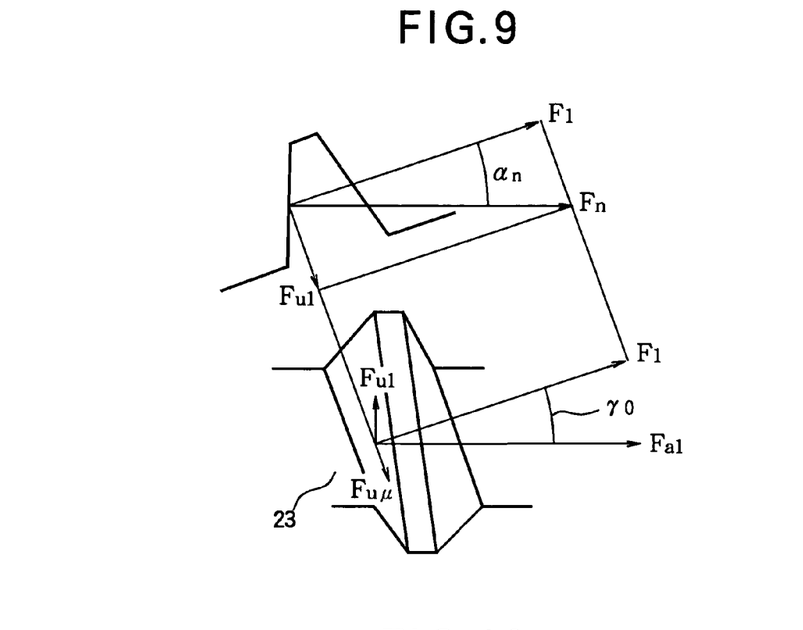
FIG. 9 illustrates the shape of the worm according to a third embodiment.

FIG. 9 illustrates the shape of the worm 23 according to a third embodiment.

A disk loading apparatus is usually designed to perform an automatic pull-in function. That is, when a tray at the disk-discharging position is to be moved to the disk-loading position, a user directly pushes the tray into the apparatus and the movement of the tray or an urging force applied by the user to the tray is detected, and subsequently a loading motor is driven in rotation.

In order to perform the aforementioned automatic pull-in function, the disk-loading mechanism requires to be designed so that the tray moves in a direction in which the user pushes the tray. In other words, the apparatus should be designed such that the rotational force of the drive gear 20 that functions as a drive gear is smoothly transmitted to the worm 23 that functions as a driven gear.

The worm gear mechanism that includes the worm 23 and the worm wheel 20b can be self-locked when the worm wheel 20b functions as a drive gear and the worm 23 functions as a driven gear. When the worm gear mechanism is self-locked, the rotation of the worm wheel 20b is not transmitted to the worm 23. However, if the worm 23 is designed to meet the following conditions, the worm gear mechanism is not self-locked.

FIG. 9 illustrates the components of forces exerted on the worm 23 when the drive gear 20 functions as a drive gear.

Referring to FIG. 9, Fa1 is a thrust of the worm 23, F1 and Fu1 are components of Fn that is a force acting normal to the tooth surface, and Fuμ is a braking force developed on the tooth surface.

The tangential force Fu1 of the worm 23 is given by the following equation.

$$Fu1 = Fn(\cos \alpha n \sin \gamma o - \mu \cos \gamma o)$$

where Fn is a force normal to the tooth surface of the worm 23, γo is a lead angle, and αn is normal pressure angle.

When Fu1 is greater than zero, the worm gear mechanism is not self-locked.

Figure 10:
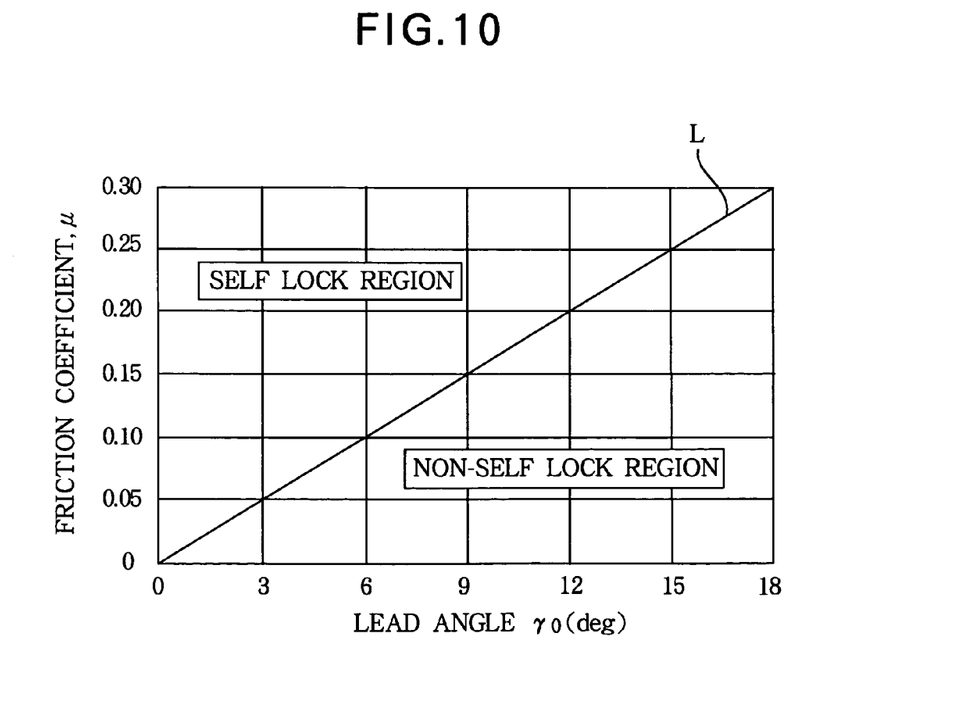
FIG. 10 plots lead angle as the abscissa and friction coefficient as the ordinate.

FIG. 10 plots lead angle γo as the abscissa and friction coefficient μ as the ordinate. The area above line L represents a self-lock region where self-lock can occur and the area below line L represents a non-self-lock region where self-lock cannot occur.

When the normal pressure angle αn is 20°, Fu1 is given as follows:

$$Fu1=Fn(\cos αn \sin γo-μ \cos γo)>0$$

In other words, self-lock will not occur in a region that satisfies the condition γo>Tan$^{-1}$(μ/Cos αn).

Usually, normal pressure angle an is selected to be about 20°. The worm gear mechanism that includes the worm 23 and the worm wheel 20 is formed of a metal material or a resin material. A lubricating oil such as grease is applied to the worm gear mechanism and therefore the friction coefficient μ is in the range of 0.2–0.25. Considering the aforementioned limitations, the worm 23 according to the third embodiment is designed to have a lead angle γo>15°. The condition γo>15° makes the worm gear mechanism a non-self-lock type, so that a drive force can be transmitted from the drive gear 20 to the worm 23. The lead angle γo is not limited to 15° but can be selected provided that the condition γo>Tan$^{-1}$(μ/Cos αn) is satisfied.

Fourth Embodiment

Figure 11:
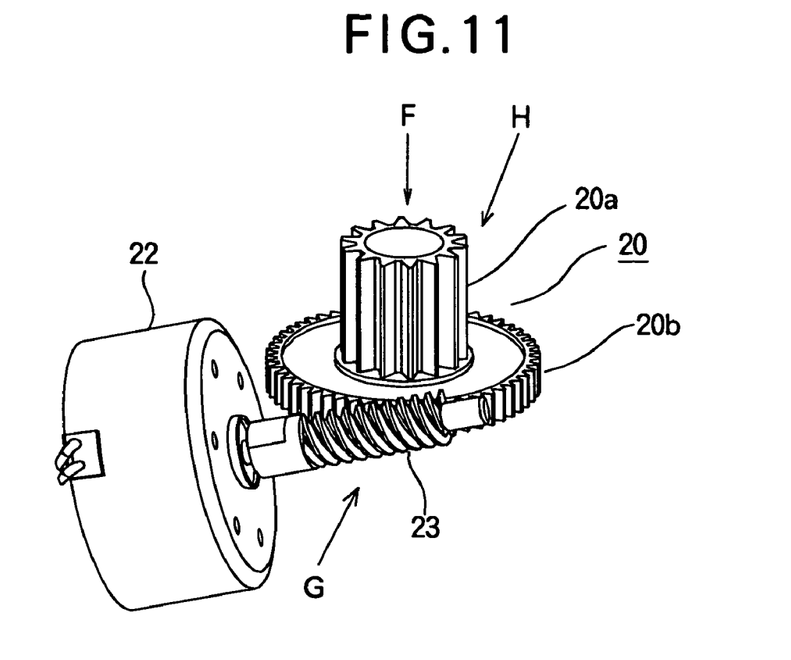
FIG. 11 is a perspective view of a, motor, a worm, and a drive gear according to a fourth embodiment.

FIG. 11 is a perspective view of a motor 22, a worm 23 and a drive gear 20 according to a fourth embodiment.

Figure 12:
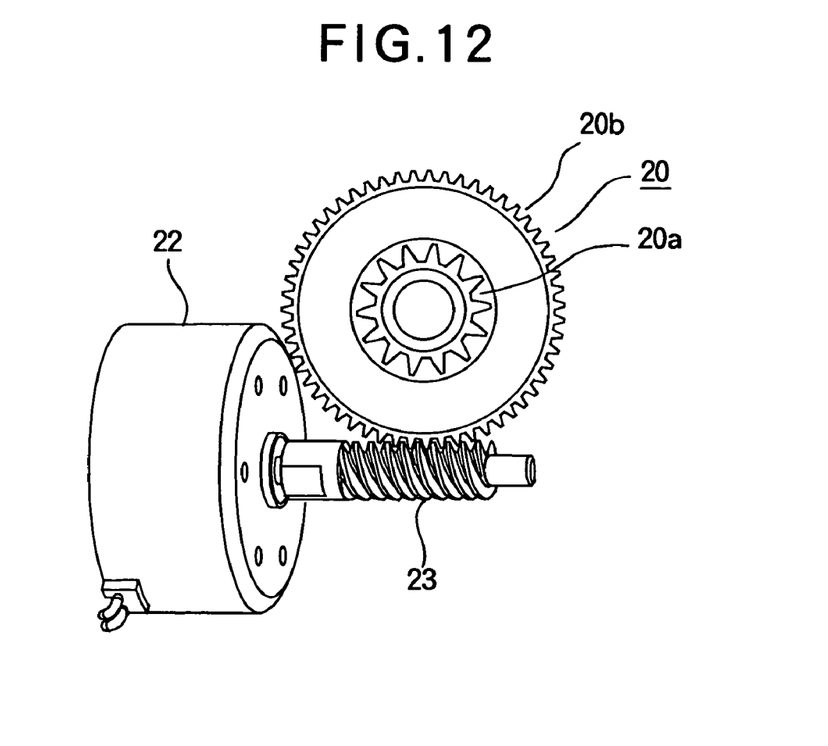
FIG. 12 is a top view of the motor, worm and drive gear as seen in a direction shown by arrow F of FIG. 11.

FIG. 12 is a top view of the motor 22, worm 23 and drive gear 20 as seen in a direction shown by arrow F of FIG. 11.

Figure 13:
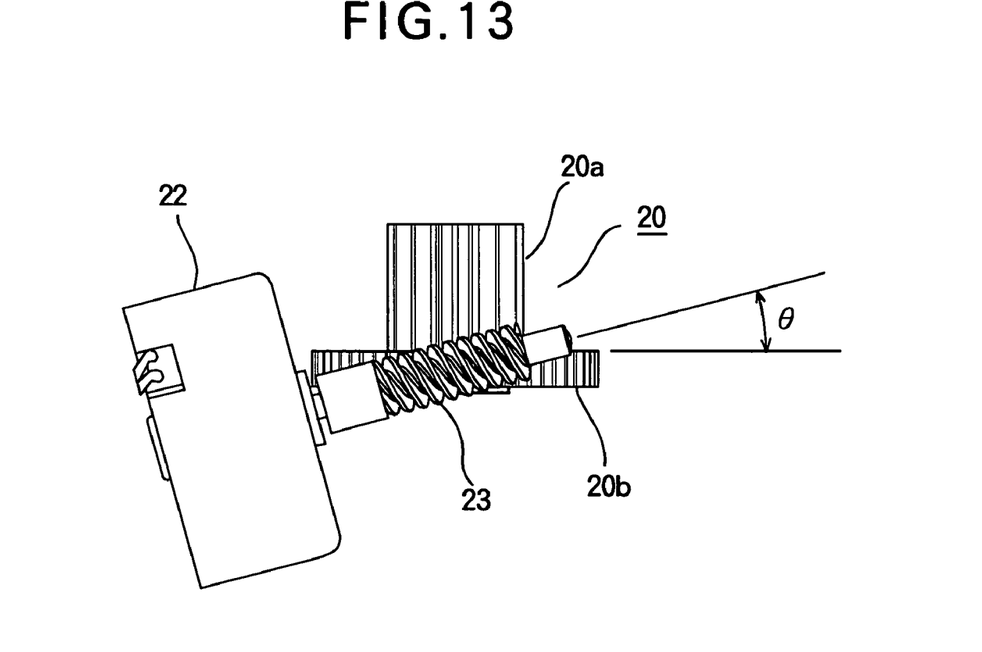
FIG. 13 is a side view of the motor, worm and drive gear as seen in a direction shown by arrow G of FIG. 11.

FIG. 13 is a side view of the motor 22, worm 23 and drive gear 20 as seen in a direction shown by arrow G of FIG. 11.

Figure 14:
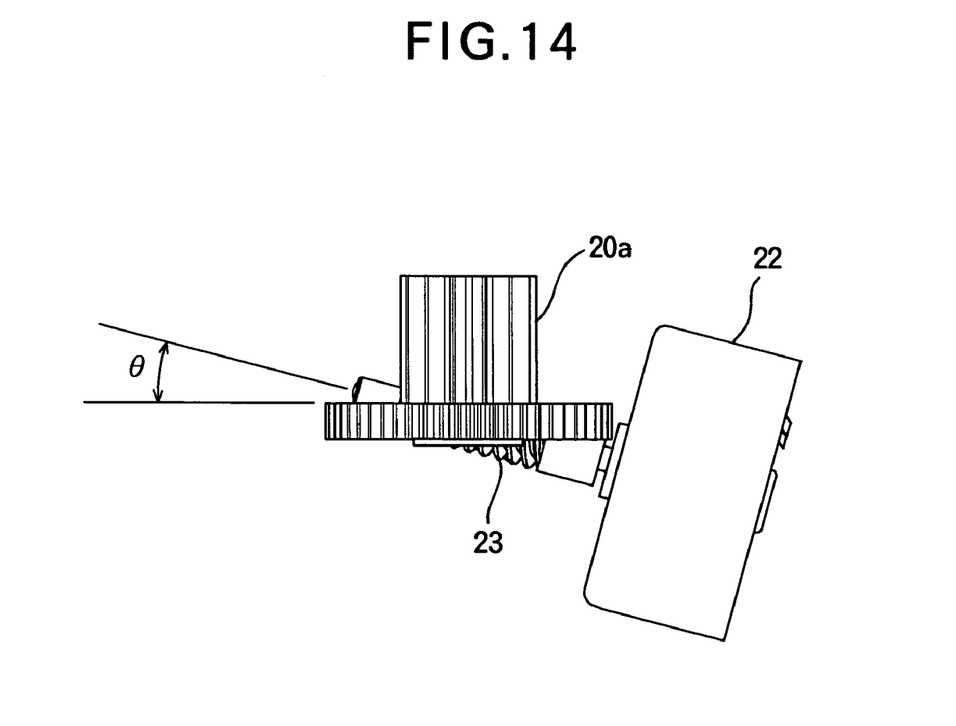
FIG. 14 is another side view of the motor, worm and drive gear as seen in a direction shown by arrow H of FIG. 11.

FIG. 14 is another side view of the motor 22, worm 23 and drive gear 20 as seen in a direction shown by arrow H of FIG. 11.

Figure 15:
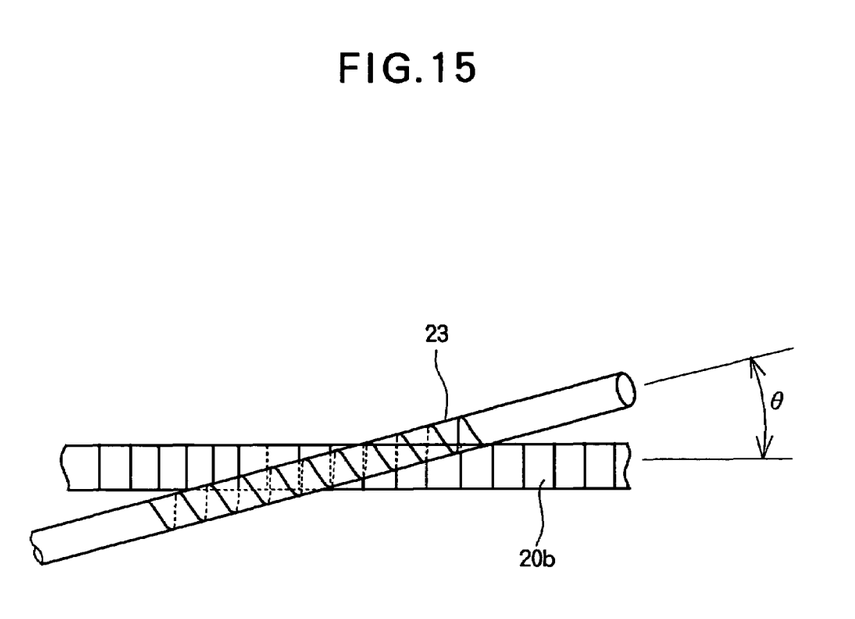
FIG. 15 illustrates the meshing engagement of the worm with the large gear.

FIG. 15 illustrates the meshing engagement of the worm 23 with the large gear 20b.

In the fourth embodiment, the worm 23 is press-fitted over the shaft of the motor 22. The shaft of the motor 22 is inclined such that the worm is at an angle θ with a plane normal to a rotational axis of the drive gear 20. This angle θ is selected to be substantially equal to a lead angle γo of the worm 23. When the motor 22 rotates, the worm 23 rotates. The motor 22 is firmly mounted to a main chassis 12 by means of bolts, not shown. The drive gear 20 includes a large gear 20b and a small gear 20a that are concentric with each other. Both the large gear 20b and small gear 20a are in the form of a spur gear. The large gear 20b has a larger pitch circle than the small gear 20a and is in mesh with the worm 23 mounted to the shaft of the motor 22.

The worm 23 and the shaft of the motor 22 are at an angle with a plane normal to a rotational axis of the gear 20, allowing the worm 23 to be in mesh with the large gear 20b. The angle is substantially equal to a lead angle γo and greater than 15°. This inclination provides a meshing engagement of the worm 23 with the large gear 20b such that the lead of the worm 23 is as parallel to the lead of the large gear 20b as possible as shown in FIG. 15. Thus, despite the fact that the large gear 20b of the drive gear 20 is a spur gear, the rotation of the worm 23 can be transmitted to the large gear 20b and the rotation of the large gear 20b can be transmitted to the worm 23. In other words, rotation can be transmitted bi-directionally between the large gear 20b and the worm 23. The relationship in FIG. 9 also holds in the fourth embodiment. The small gear 20a of the drive gear 20a may be in mesh with the rack 3a in FIG. 1 to drive the rack 3a.

The meshing engagement of the worm 23 with the large gear 20b in the manner described above provides the following advantages.

Inclining the worm 23 at an angle with a plane normal to the rotational axis of the drive gear 20 allows the large gear 20b to be in the form of a spur gear instead of a helical gear.

If a helical gear is to be molded from a plastic material, the mold necessarily has undercuts that exist in a direction in which the mold is to be opened. This necessitates a rotating mechanism that rotates in synchronism with the opening of the mold. Consequently, the mold is necessarily complex. A complex mold is expensive and therefore causes an increase in the manufacturing cost of the molded parts.

In contrast to this, the large gear 20b in the form of a spur gear allows significant reduction in the manufacturing cost of molded parts as compared with the large gear 20b in the form of a helical gear. In order that a spur gear can function as a worm wheel that meshes with a worm properly, the face width of the spur gear must be very small (i.e., the spur gear should be very thin). This is achieved only at the sacrifice of mechanical strength of the teeth of the spur gear. The fourth embodiment eliminates the aforementioned design limitations of face width. In other words, the fourth embodiment provides proper meshing engagement between the worm and the spur gear while still maintaining sufficient mechanical strength of the spur gear.

The meshing engagement of the large gear 20b with the worm 23 according to the fourth embodiment may also be applied to a motor that drives an optical disc to retrieve data from the optical disc. Assume that the shaft of the motor 22 has a spur gear in place of the worm 23 and the rotation of the spur gear on the motor side is transmitted to another spur gear through which the rotation of the motor 22 is transmitted to the rack 3a. When the tray moves between the disk-discharging position and the disk-loading position, the motor rotates as fast as several thousand rotations per minute. This high-speed rotation of the motor causes annoying noise resulting from a small difference in pitch between the two spur gears.

One way of reducing such annoying noise is to use a relatively soft material such as nylon for making the spur gear in mesh with the rack 3. However, a nylon gear is as expensive as 5 times a plastic gear such as a polyester gear.

Even when the motor rotates at a speed as high as several thousand rotations per minute, the combination of the worm 23 with the drive gear 20 reduces the speed of the motor to several hundred rotations of the drive gear 20 per minute. This greatly reduces annoying noise that would otherwise result from a difference in the pitch of teeth. Thus, the fourth embodiment eliminates the need for using an expensive material such as nylon for the drive gear 20 but allows use of relatively inexpensive materials such as plastics while also ensuring quiet disk-loading operation.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A disk-loading apparatus in which a main chassis supports a tray that carries a disk thereon and slides between a disk-discharging position and a disk-loading position, the apparatus comprising:

a motor mounted on the main chassis and having a rotating shaft;

a worm formed on the rotating shaft;

a drive gear rotatably mounted on the main chassis, said drive gear having a first gear and a second gear, the second gear being in mesh with said worm; and a rack formed in the tray and in mesh with the first gear so that when the motor rotates the tray is moved between the disk-discharging position and the disk-loading position;

wherein the worm satisfies the following dimensional condition, $$\gamma o > \text{Tan}^{-1}(\mu/\text{Cos } \alpha n)$$

where $\gamma o$ is a lead angle, $\mu$ is a friction coefficient, and $\alpha n$ is a normal pressure angle; and wherein the rotating shaft extends in a direction at an angle with a plane in which the disk moves when the tray moves between the disk-discharging position and the disk-loading position.

2. The apparatus according to claim 1, wherein the rotating shaft extends in a direction parallel to a plane in which the disk moves when the tray moves between the disk-discharging position and the disk-loading position.

3. The apparatus according to claim 1, wherein the worm has a lead angle $\gamma o$ greater than 15°.

4. The apparatus according to claim 1, wherein said motor has a threaded hole formed therein, the threaded hole extending parallel to the rotating shaft, said motor being mounted to the main chassis by means of a bolt screwed into the threaded hole.

5. The apparatus according to claim 1, wherein said drive gear is rotatable about an axis substantially perpendicular to a plane in which the tray moves.

6. The apparatus according to claim 1, wherein the worm and the worm wheel are meshed such that they are non-self locked during an operation of the disk-loading apparatus.

7. A disk-loading apparatus in which a main chassis supports a tray that carries a disk thereon and slides between a disk-discharging position and a disk-loading position, the apparatus comprising:

a motor mounted on the main chassis and having a rotating shaft;

a worm formed on the rotating shaft;

a drive gear rotatably mounted on the main chassis, said drive gear having a first gear and a second gear, the second gear being in mesh with said worm; and a rack formed in the tray and in mesh with the first gear so that when the motor rotates the tray is moved between the disk-discharging position and the disk-loading position;

wherein the rotating shaft extends in such a direction that said worm extends in a direction at an angle with a plane normal to a rotational axis of said drive gear.

8. The apparatus according to claim 7, wherein the angle is substantially equal to a lead angle of said worm.

9. The apparatus according to claim 7, wherein the lead angle is greater than 15°.

10. The apparatus according to claim 7, wherein said drive gear is rotatable about an axis substantially perpendicular to a plane in which the tray moves.

11. The apparatus according to claim 7, wherein said worm and said drive gear are meshed such that they are non-self locked during an operation of the disk-loading apparatus.

* * * * *